(12) United States Patent
Meyers et al.

(10) Patent No.: US 8,150,841 B2
(45) Date of Patent: Apr. 3, 2012

(54) DETECTING SPIKING QUERIES

(75) Inventors: Christopher Avery Meyers, Kirkland, WA (US); Gopi Prashanth Gopal, Redmond, WA (US); Andrew Peter Oakley, Seattle, WA (US); Nitin Agrawal, Redmond, WA (US); Nicholas Eric Craswell, Redmond, WA (US); Milad Shokouhi, Cambridge (GB); Derrick Leslie Connell, Bellevue, WA (US); Sanaz Ahari, Kirkland, WA (US); Neil Bruce Sharman, Sammamish, WA (US); Gaurav Sareen, Sammamish, WA (US); Hugh Evan Williams, Saratoga, CA (US); Jay Kumar Goyal, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 12/690,184

(22) Filed: Jan. 20, 2010

(65) Prior Publication Data

US 2011/0179017 A1 Jul. 21, 2011

(51) Int. Cl.
*G06F 7/00* (2006.01)
*G06F 17/30* (2006.01)

(52) U.S. Cl. ...................................................... 707/722

(58) Field of Classification Search .................. None
See application file for complete search history.

(56) References Cited

U.S. PATENT DOCUMENTS

| | | | |
|---|---|---|---|
| 5,864,845 A | 1/1999 | Voorhees | |
| 7,428,529 B2 | 9/2008 | Zeng | |
| 7,519,590 B2 | 4/2009 | Chandrasekar | |
| 7,584,221 B2 | 9/2009 | Robertson | |
| 7,624,447 B1 * | 11/2009 | Horowitz et al. | 726/23 |
| 2005/0055341 A1 | 3/2005 | Haahr | |
| 2006/0047649 A1 | 3/2006 | Liang | |
| 2006/0195442 A1 | 8/2006 | Cone | |
| 2007/0192293 A1 | 8/2007 | Swen | |
| 2008/0120292 A1 | 5/2008 | Sundaresan | |
| 2008/0255935 A1 * | 10/2008 | Madhavan et al. | 705/14 |
| 2009/0063455 A1 | 3/2009 | Li | |

FOREIGN PATENT DOCUMENTS

EP 2073131 A1 6/2009

OTHER PUBLICATIONS

Yair Shimshoni, Niv Efron, and Yossi Matias, "On the predictability of Search Trends", Google Research Blog, Google Labs, Israel, Aug. 17, 2009, http://googleresearch.blogspot.com/2009/08/on-predictability-of-search-trends.html.

(Continued)

*Primary Examiner* — Uyen T. Le
(74) *Attorney, Agent, or Firm* — Shook, Hardy & Bacon L.L.P.

(57) ABSTRACT

Methods, systems, and media are provided for identifying and clustering queries that are rising in popularity. Resultant clustered queries can be compared to other stored queries using textual and temporal correlations. Fresh indices containing information and results from recently crawled content sources are searched to obtain the most recent query activity. Historical indices are also searched to obtain temporally correlated information and results that match the clustered query stream. A weighted average acceleration of a spike can be calculated to distinguish between a legitimate spike and a non-legitimate spike. Legitimate clusters are combined with other stored clusters and presented as grouped content results to a user output device.

20 Claims, 8 Drawing Sheets

OTHER PUBLICATIONS

Jeremy Ginsberg, et al., "Letter: Detecting influenza epidemics using search engine query data", nature, International weekly journal of science, Feb. 19, 2009, http://www.nature.com/nature/journal/v457/n7232/full/nature07634.html.

Jeremy Ginsberg, et al., "Detecting influenza epidemics using search engine query data", Google, originally published in Nature vol. 457, Feb. 19, 2009.

Qiankun Zhao, et al., "Time-Dependent Semantic Similarity Measure of Queries Using Historical Click-Through Data", International World Wide Web Conference Committee, WWW 2006, May 23-26, 2006, Edinburgh, Scotland.

Michail Vlachos, et al., "Identifying Similarities, Periodicities and Bursts for Online Search Queries", ACM, SIGMOD 2004 Jun. 13-18, 2004, Paris, France.

Donald Metzler, et al., "Improving Search Relevance for Implicitly Temporal Queries", SIGIR'09, Jul. 19-23, 2009, Boston, Massachusetts, USA.

Vassilis Plachouras, "Yahoo! Temporal Aspects of Web Search", Yahoo! Research, Barcelona, Jun. 18, 2007.

Hyunyoung Choi and Hal Varian, "Predicting the Present with Google Trends", Google Inc., Apr. 10, 2009.

Yair Shimshoni, Niv Efron, and Yossi Matias, "On the Predictability of Search Trends", Google, Israel Labs, Aug. 17, 2009.

Ricardo Baeza-Yates, Carlos Hurtado and Marcelo Mendoza, "Mining Search Engines Logs: Clustering Query Traces", Universidad de Chile, Feb. 2005, http://wrg.upt.edu/WRG/dctos/talk2.pdf.

Huanhuan Cao, et al., "Context-Aware Query Suggestion by Mining Click-Through and Session Data", ACM, KDD'08, Aug. 24-27, 2008, Las Vegas, Nevada, http://research.microsoft.com/en-us/people/hangli/cao_et_al_kdd_2008.pdf.

Steve Chien and Nicole Immorlica, "Semantic Similarity Between Search Engine Queries Using Temporal Correlation", in Proceedings of the 14th international conference on World Wide Web, (WWW 2005), pp. 2-11, ACM, Chiba, Japan, 2005, http://www2005.org/cdrom/docs/p2.pdf.

Piotr Indyk and Rajeev Motwani, "Approximate Nearest Neighbors: Towards Removing the Curse of Dimensionality", Department of Computer Science, Stanford University, Stanford, California, Dec. 30, 1999.

"Johnson-Lindenstrauss lemma", Wikipedia, Retrieved Date: Dec. 15, 2009, http://en.wikipedia.org/wiki/Johnson%E2%80%93Lindenstrauss_lemma.

* cited by examiner

DETECTING SPIKING QUERIES

BACKGROUND

An abrupt sharp increase in search query activity, commonly referred to as spiking, can result from a number of sources. Spiking can result from regular and popular occurrences such as a holiday or sporting event, or from irregular events such as a high profile death or a natural disaster. Spiking can also occur as a result of mass marketing attempts or malicious network attacks.

Several systems exist to identify a spiking query trend after it has occurred. However, identifying a spiking query trend at the beginning of the trend would be more difficult and complex. It would also be difficult to distinguish between a legitimate spike and a malicious or non-legitimate spike until the event is well under way or until the event has already ended.

SUMMARY

Embodiments of the invention are defined by the claims below. A high-level overview of various embodiments of the invention is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

Embodiments of the invention include computer-implemented methods and systems of identifying, classifying, clustering, and presenting results for legitimate search query spikes. Input query activity, referred to as a query stream is received and monitored for any spiking activity. When a particular query is identified as spiking, then various components of the spiking query are compared to and clustered with other stored queries which exhibit similar behavior or characteristics, including temporal and textual correlations.

Some previously received queries are retrieved through fresh indices, which contain information and results from recently crawled content sources. Some previously received queries are also retrieved through historical indices, which contain information and results that can be temporally correlated to the clustered query stream. A weighted average acceleration of the spike can be calculated to determine if the spike is a result of popular query interest or possibly a malicious attack. Clustered results from legitimate spiking queries are presented to a user output device according to grouped content, such as a seasonal gallery of results.

Legitimate clusters are merged with similar existing clusters or established as new clusters. These merged and newly established clusters are stored with the previously stored clusters for comparison to future query stream activity and to present as query suggestions. Another embodiment of the invention includes computer-readable media, having instructions stored thereon, that when executed by a computing device, perform the above-described methods.

BRIEF DESCRIPTION OF THE DRAWINGS

Illustrative embodiments of the invention are described in detail below, with reference to the attached drawing figures, which are incorporated by reference herein, and wherein.

DETAILED DESCRIPTION

Figure 1:
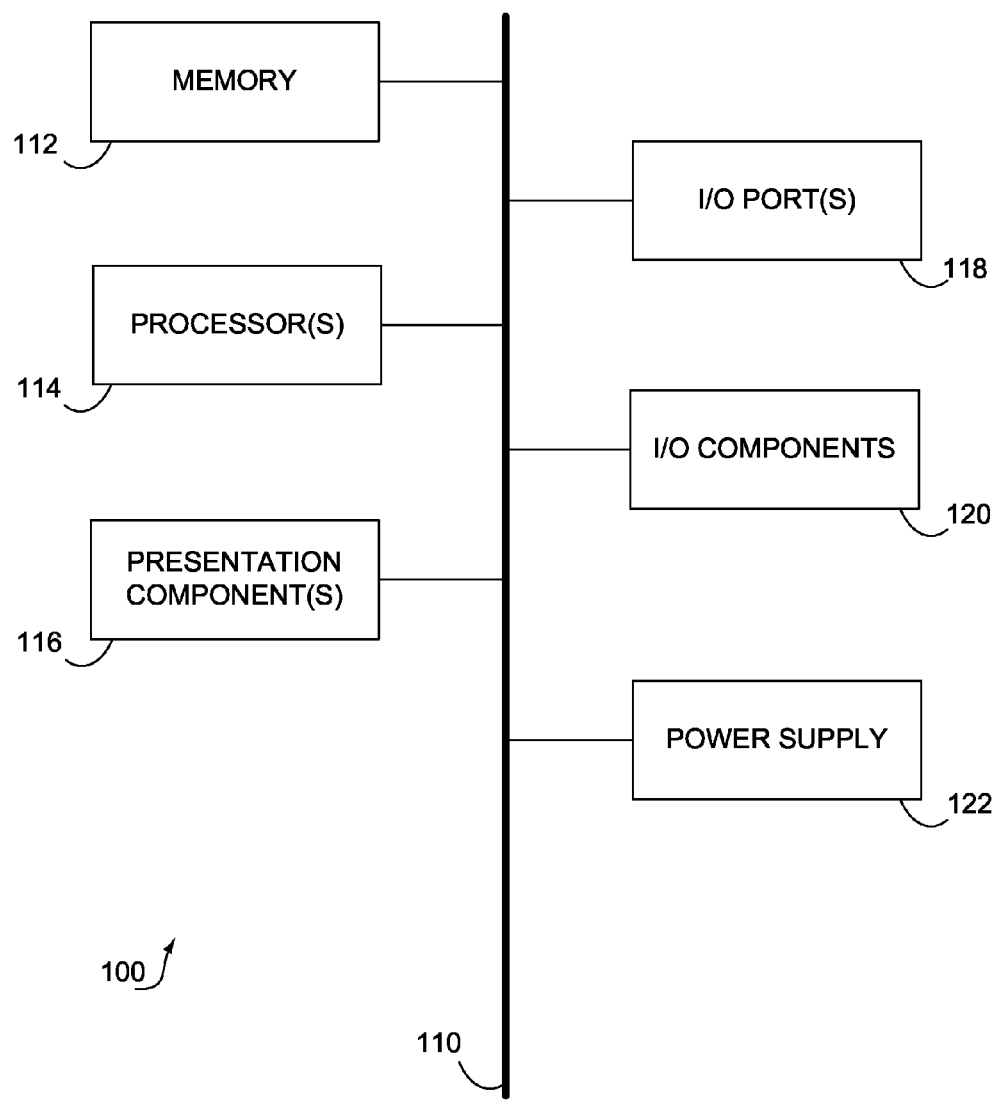
FIG. 1 is a block diagram illustrating an exemplary computer operating environment used in accordance with embodiments of the invention.

Embodiments of the invention provide systems, methods and computer-readable storage media for identifying, clustering, and presenting popular spiking queries. This detailed description and the following claims satisfy the applicable statutory requirements.

The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Throughout the description of different embodiments of the invention, several acronyms and shorthand notations are used to aid the understanding of certain concepts pertaining to the associated systems, methods and computer-readable media. These acronyms and shorthand notations are intended to help provide an easy methodology for communicating the ideas expressed herein and are not meant to limit the scope of any embodiment of the invention.

Embodiments of the invention include, without limitation, methods, systems, and sets of computer-executable instructions embodied on one or more computer-readable media. Computer-readable media include both volatile and nonvolatile media, removable and non-removable media, and media readable by a database and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, random access memory (RAM), read-only memory (ROM), electrically erasable programmable read-only memory (EEPROM), flash memory or other memory technology, compact-disc read-only memory (CD-ROM), digital versatile discs (DVD), holographic media or other optical disc storage, magnetic cassettes, magnetic tape, magnetic disk storage, and other magnetic storage devices. These examples of media can be configured to store data momentarily, temporarily, or permanently. The computer-readable media include cooperating or interconnected computer-readable media, which exist exclusively on a processing system or distributed among multiple interconnected processing systems that may be local to, or remote from, the processing system.

Embodiments of the invention may be described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

In some embodiments, a computer-implemented method of identifying a legitimate search query spike using a computing system having memory, processor, and data storage subsystems is provided. A plurality of search query requests is received from one or more user input devices. The search queries are classified as spiking or non-spiking. One or more spikes present in the received search query requests are identified. The identified spikes are clustered together according to a temporal or textual correlation, then a rate of acceleration for each spike is determined via the processor of the computing system. The determined rate of acceleration for the clustered identified spikes is compared with a similar temporal behavior of stored clusters. A malicious attack can be identified for a particular clustered spike when the determined rate of acceleration exceeds a first threshold level and a comparison to temporal behavior is lower than a second threshold level. The received search query requests and results, which are not malicious clustered spikes are stored as one or more groups of content in the data storage subsystem of the computing system. The non-malicious clustered spikes are used for comparison and query suggestions to future related search query requests. In another embodiment, one or more computer-readable storage media, which contain computer readable instructions embodied thereon that, when executed by a computing device, perform the above-described method of identifying a legitimate search query spike.

In certain embodiments, a computer-implemented method of producing popular search query results using a computing system having memory, processor, and data storage subsystems is provided. A search query request is received from a user input device. A spike is identified in a query stream, which contains the received search query request and other incoming search query requests. The spike in the query stream is temporally correlated with relevant content from a plurality of historical indices as a result of searching those historical indices. The spike in the query stream is also correlated with relevant content from a plurality of fresh indices as a result of searching those fresh indices. The fresh indices contain information and results from recently crawled content sources. A rate of acceleration is determined by which the spike in the query stream is received, using the processor of the computing system. The determined rate of acceleration is compared with a temporal behavior of similar stored search queries. Results from searching the historical indices and the fresh indices are analyzed to determine if the search query request should be clustered with an existing group of search query results, using a grouped content algorithm. A malicious attack can be identified when a rate of acceleration of a particular clustered spike exceeds a first threshold level and a comparison to temporal behavior is lower than a second threshold level. Non-malicious clustered spikes of the query stream are stored as one or more seasonal galleries in the data storage subsystem of the computing system. Results of the search query request are prioritized according to an age and size of identified clustered results. The one or more seasonal galleries and the prioritized results are communicated to a user output device. In another embodiment, one or more computer-readable storage media contain computer-readable instructions embodied thereon that, when executed by a computing device, perform the above-described method of producing popular search query results.

In yet other embodiments, a computer-implemented method of identifying and clustering queries that are increasing in popularity using a computing system having memory, processor, and data storage subsystems is provided. A search query request is received from a user input device. A spike in incoming query stream activity, which contains the search query request is identified. The spike in the incoming query stream activity is temporally correlated with relevant content from a plurality of historical indices as a result of searching those historical indices. The spike in the incoming query stream activity is also correlated with relevant content from a plurality of fresh indices as a result of searching those fresh indices. The fresh indices contain information and results from recently crawled content sources. The results from searching the historical indices and the fresh indices are analyzed to determine if the search query request should be clustered with an existing group of search query results. The results of the search query request are prioritized according to an age and size of identified cyclic clustered results. The prioritized results of the search query request are communicated to a user output device. In another embodiment, one or more computer-readable storage media contain computer-readable instructions embodied thereon that, when executed by a computing device, perform the above-described method of identifying and clustering queries that are increasing in popularity.

Having briefly described a general overview of the embodiments herein, an exemplary computing device is described below. Referring initially to FIG. 1, an exemplary operating environment for implementing embodiments of the present invention is shown and designated generally as computing device 100. The computing device 100 is but one example of a suitable computing system and is not intended to suggest any limitation as to the scope of use or functionality of embodiments of the invention. Neither should the computing device 100 be interpreted as having any dependency or requirement relating to any one or combination of components illustrated. In one embodiment, the computing device 100 is a conventional computer (e.g., a personal computer or laptop). Embodiments of the invention are also applicable to a plurality of interconnected computing devices, such as computing devices 100.

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, delineating various components in reality is not so clear, and metaphorically, the lines would more accurately be gray and fuzzy. For example, one may consider a presentation component 116 such as a display device to be an I/O component 120. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device" or "computing system."

The computing device 100 can include a variety of computer-readable media. By way of example, and not limitation, computer-readable media may comprise RAM, ROM, EEPROM, flash memory or other memory technologies, CDROM, DVD or other optical or holographic media, magnetic cassettes, magnetic tape, magnetic disk storage or other magnetic storage devices, or similar tangible media that are configurable to store data and/or instructions relevant to the embodiments described herein.

The memory 112 includes computer-storage media in the form of volatile and/or nonvolatile memory. The memory 112 may be removable, non-removable, or a combination thereof. Exemplary hardware devices include solid-state memory, hard drives, cache, optical-disc drives, etc. The computing device 100 includes one or more processors 114, which read data from various entities such as the memory 112 or the I/O components 120. The presentation components 116 present data indications to a user or other device. Exemplary presentation components 116 include display devices, speaker devices, printing devices, vibrating devices, and the like.

The I/O ports 118 logically couple the computing device 100 to other devices including the I/O components 120, some of which may be built in. Illustrative I/O components 120 include a microphone, joystick, game pad, satellite dish, scanner, printer, wireless device, etc.

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which communicate wirelessly. One skilled in the art will appreciate that wireless devices will also include a processor and computer-storage media, which perform various functions. Embodiments described herein are applicable to both a computing device and a wireless device. In embodiments, computing devices can also refer to devices which run applications of which images are captured by the camera in a wireless device.

The computing system described above is configured to be used with the several computer-implemented methods, systems, and media generally described above and described in more detail hereinafter. The embodiments of the invention provide computer-implemented methods, systems, and media of identifying legitimate query spikes and clustering popular queries.

Clustering is a statistical process that attempts to find one or more common structures in a collection of items. The clustering separates the entire collection of items into discrete groups whose members have some common feature. A threshold level of commonality is usually used to determine which items will be grouped together. An item that does not satisfy the threshold may be either grouped with another cluster or used to form a new group.

Clustering is a process of discovering structure in a collection of characters. If there is a commonality between a text string and an existing cluster that satisfies a pre-defined threshold, then the text string is added to the cluster, based upon a textual similarity. If the commonality does not satisfy the pre-defined threshold, then a new cluster may be created.

Clustering can also be based upon a temporal correlation, in which items are clustered together based upon a similarly timed or calendar event. Two queries are inferred to be related if their popularities behave similarly over time. A temporal correlation uses query context to implicitly "understand" why a query is interesting at a particular time. For example, the query chocolate becomes popular in February and the query pumpkin becomes popular in October. Even though chocolate and February have no textual similarity (and pumpkin and October have no textual similarity), these combinations are associated together because of their temporal correlation. This approach provides a quick adjustment to current events, such as news events. Queries related to an event will begin to appear immediately in a search engine query stream. A query stream is defined herein as a real time query input.

A formal measure of temporal correlation can be devised by defining the frequency of a query x over a particular time unit t as the ratio of the number of occurrences of x in t to the total number of queries in t. The measure of the temporal correlation between two queries x and y over a span of many time units is the standard correlation coefficient of the frequencies of x and y. This correlation coefficient is a value between −1 and +1, where larger values indicate a stronger correlation.

A combination of a nearest neighbor algorithm and the theory of embeddings finds approximate top-correlated queries. Much of the data stored and manipulated on computers can be represented as points in a high-dimensional space. However, the necessary algorithms for working with such data tend to become bogged down very quickly as dimension increases. In the theory of embeddings, points from high dimensional space are embedded into a low-dimensional space in such a way that distances between the points are nearly preserved. In a nearest neighbors algorithm, a set of points P is processed to find a point p within the set P that is closest to a query point q within a query set Q. The features of objects are represented as points in a defined space, and a distance metric is used to measure the similarity of dissimilarity of objects. Determining an approximate nearest neighbor for a reasonable distance metric should suffice for most practical purposes, thereby greatly reducing the number of dimensions. This combined approach of the theory of embeddings and a nearest neighbor algorithm makes real-time processing of input queries feasible. Using a correlation of frequency functions normalizes the variance, and therefore false queries with a high variance become normalized rather than appearing to be a real spike or a popular query. This is just one example of implementing a temporal correlation between queries, and other temporal correlations can be implemented with embodiments of the invention.

Figure 2:
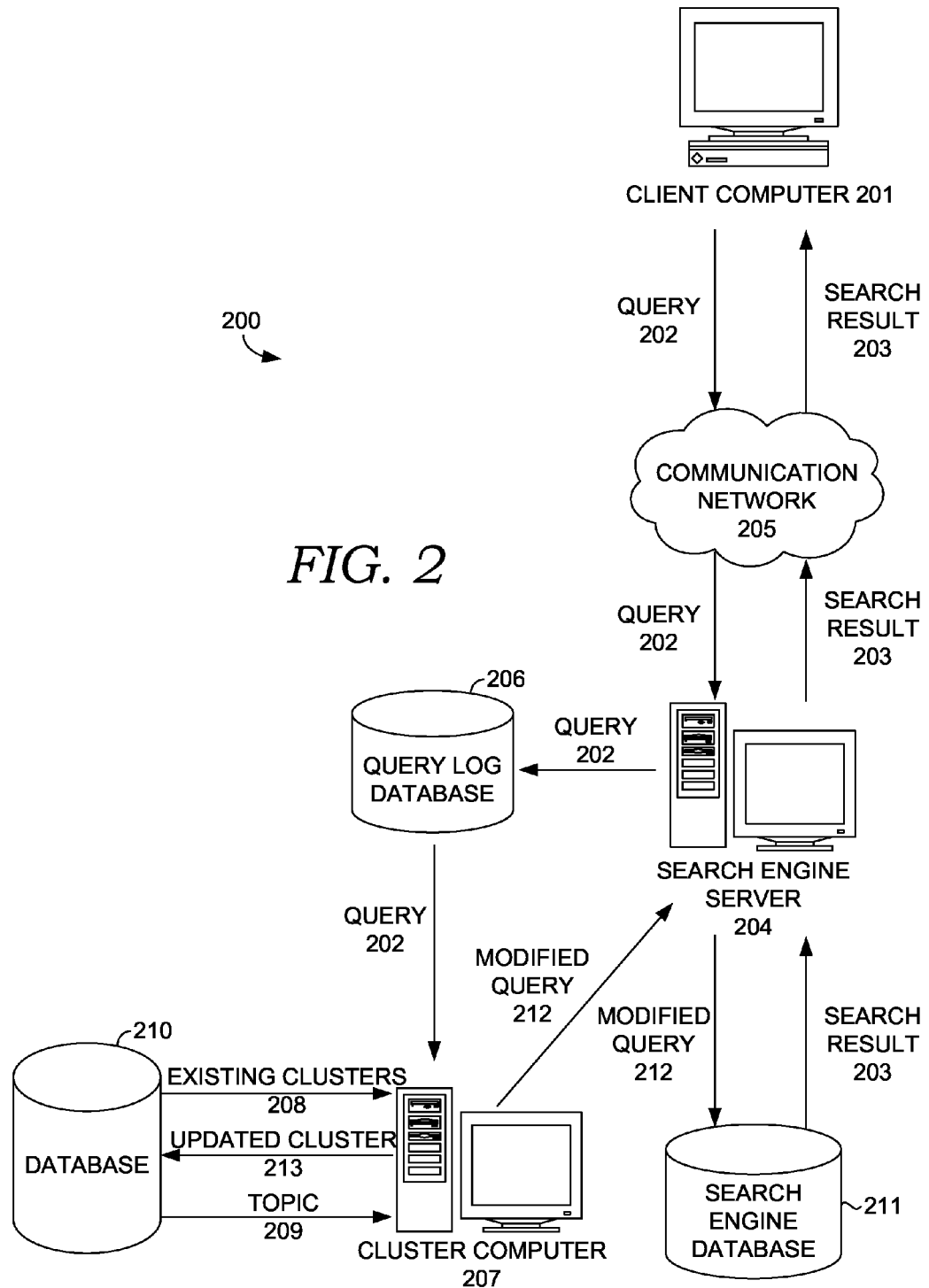
FIG. 2 is a block diagram of a client server system used in accordance with embodiments of the invention.

FIG. 2 is a block diagram of a client server system with a search engine for which embodiments of the invention may be implemented. The client server system 200 includes a client computer 201 coupled to a communication network 205. Client computer 201 may comprise a personal computer, as described with reference to FIG. 1. Client computer 201 may have an extensible markup language (xml) and/or hypertext markup language (html) based browser software installed thereon. Communication network 205 may be for example, a LAN or WAN, or the Internet. It should be understood that while one client computer 201 is shown in FIG. 2, in practice, there may be many client computers simultaneously accessing communication network 205.

Communication network 205 is further coupled to a search engine server 204, where search engine server 204 is coupled to a search engine database 211. Client computer 201 sends a query 202 to search engine server 204 via communication network 205. In return from search engine server 204, client computer 201 receives a search result 203, corresponding to data located in search engine database 211.

Search engine server 204 is coupled to a query log database 206. Query log database 206 stores query 202 into a database comprising all received queries from one or more client computers 201. Query 202 is received from query log database 206 by a cluster computer 207, where query 202 is compared to existing clusters 208 stored in database 210. Updated clusters 213 will be provided to database 210, depending upon a degree of commonality between query 202 and existing clusters 208 in database 210. If query 202 satisfies a predetermined degree of commonality with existing clusters 208, then query 202 will be added to the subject cluster. If query 202 does not satisfy the predetermined degree of commonality with an existing cluster 208, then query 202 will create a new cluster. Cluster computer 207 may then export a topic 209 from database 210, which will be a member of a cluster in database 210. Once topic 209 has been determined, cluster computer 207 then provides topic 209 to search engine server 204 in the form of a modified query 212. Search engine server 204 conducts a search of modified query 212 in search engine database 211. Search engine database 211 then provides a search result 203 to search engine server 204. Search engine server 204 then provides search result 203 to client computer 201 via communication network 205. FIG. 2 is just one example of a client server system that could be used with embodiments of the invention. Other systems or variations of the client server system described above could also be utilized with embodiments of the invention.

Clustering of queries reduces noise and helps differentiate between a spike and noise. Clustering input queries from the query stream according to a temporal or textual correlation provides a grouped content search query response, such as a cyclic clustering or a seasonal gallery. Algorithms are used with existing query logs to determine key clusters that form over a period of time. The clusters are often associated with key events such as holidays, sporting events, or awards; however, clustering can be used for both seasonal and non-seasonal trends. In addition, the queries performed will often vary with time before, during, and after an event. By combining existing query logs (historical logs) with query streams (current activity), the algorithms provide an association with the time span of an event for which users would be interested. Therefore, the search results page will include regular algorithmic results, as well as other groups of results for other pertinent queries that users perform. The grouped content results can be sorted according to the newness (age) and size of the spiking query. The size of the clusters is usually a good indicator of the importance of a temporal event. Clusters with a single query or a few queries are often spam, since people search for the same information using different queries. If a temporal cluster or a group of very similar clusters appear at regular time spans, then it is considered to be a cyclic cluster. A cyclic cluster is seasonal if the time span of the cyclic cluster is one year, hence it is called a seasonal cyclic cluster, or a seasonal gallery.

An example of a grouped content search query response will be described using a search query topic of awards, such as Oscar™, Golden Globe™, or Grammy Awards™. A certain number of days or weeks prior to the event, users may be interested in previous winners, nominees, or images and videos of previous winners. Therefore, in addition to the regular algorithmic results for a query, results will also be returned for nominees, images and videos. Just before the event, additional results returned may include preparation for the actual event. Similarly, after the event has occurred, returned results may include this year's winners, along with images and videos from this year's event. Another example query would be for the topic of Mother's Day. Approximately one month before Mother's Day, queries tend to be research oriented for things such as gift ideas, deals, dates, and quotes. Right before Mother's Day, queries may be clustered around last minute shipping. After Mother's Day, queries may be clustered around gift returns.

Grouped content search query results will evolve to associate and include other groups, depending upon the timing in relation to the query event date. For queries that are spikey in nature, fresh data results are often more related to the user intent. For example, a typical query for Hawaii may usually be clustered around travel and vacation. However, if a volcano just erupted in Hawaii, then the grouped content results would still return typical results for travel and vacation, but would also return currently updated results for the volcano activity.

Figure 3:
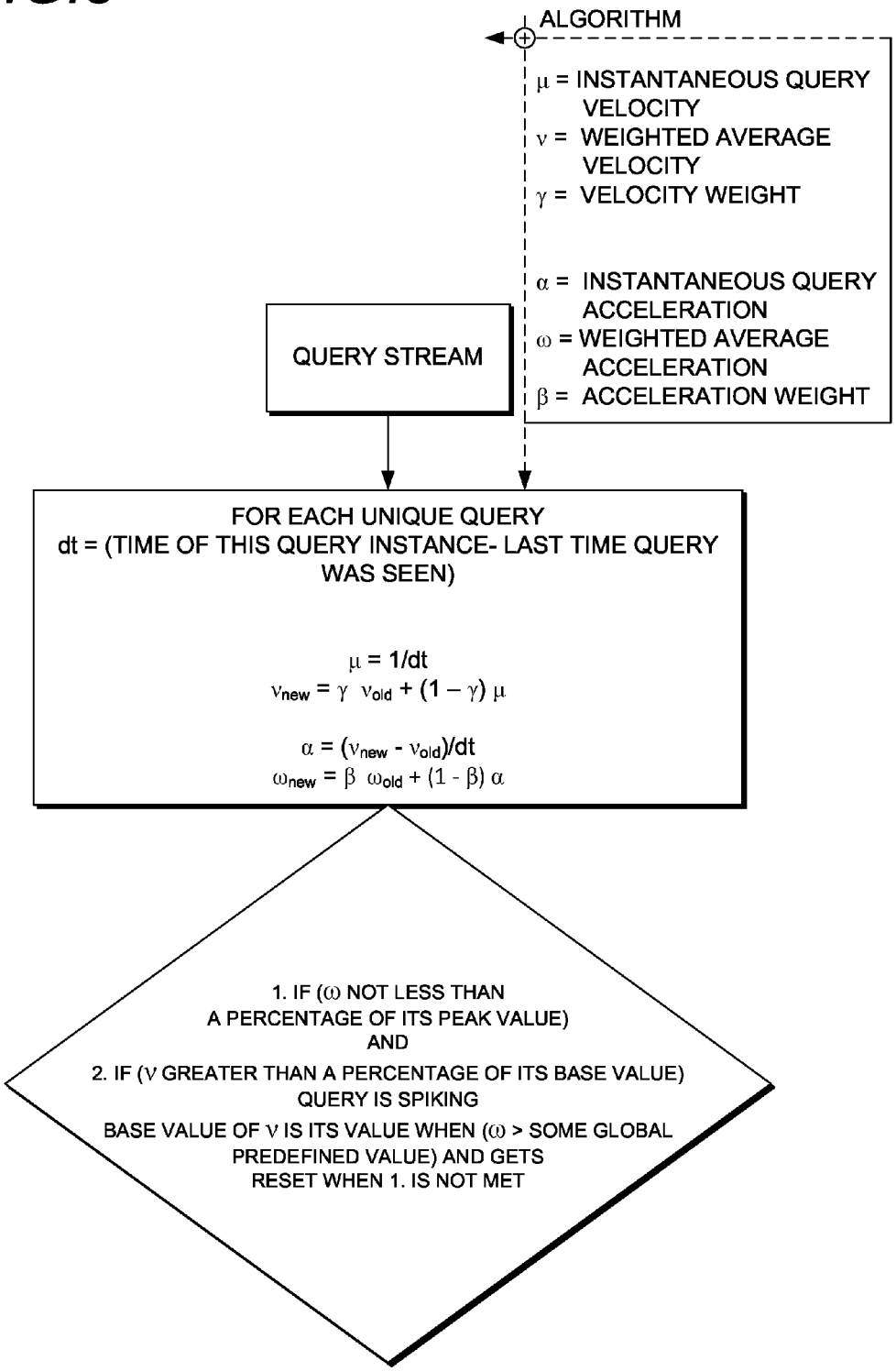
FIG. 3 is a diagram illustrating exemplary calculations for detecting spiking queries used in accordance with embodiments of the invention.

A computer-implemented method for detecting spiking queries using a weighted average method will now be described, with reference to FIG. 3. For each unique query in a query stream, an instantaneous velocity is calculated. This is calculated as the inverse of a difference in time between an instant query request and a most recent query request for a particular parameter. This is illustrated in FIG. 3, where dt= (time of this query instance—last time query was seen), and $\mu$=instantaneous query velocity=1/dt. A new, or updated weighted average velocity ($v_{new}$) is calculated as a combination of the old, or previous weighted average velocity ($\gamma v_{old}$) and a weighted instantaneous velocity [$(1-\gamma) \mu$]. $\gamma$ represents the weight applied to the velocity, which ranges from 1 (no weight given) to 0 (very important weighting). This is illustrated in FIG. 3, where $v_{new}=\gamma v_{old}+(1-\gamma) \mu$=new, or updated weighted average velocity. An instantaneous query acceleration ($\alpha$) for each query request for the particular parameter is calculated, as a difference between the new, or updated weighted average velocity and the old, or previous weighted average velocity multiplied by the instantaneous query velocity. This is illustrated in FIG. 3, where $\alpha=(v_{new}-v_{old})$ $\mu$=instantaneous query acceleration. The new, or updated weighted average acceleration ($\omega_{new}$) is calculated as a combination of the old, or previous weighted average acceleration ($\beta \omega_{old}$) and a weighted instantaneous acceleration [$(1-\beta) \alpha$]. $\beta$ represents the weight applied to the acceleration, which ranges from 1 (no weight given) to 0 (very important weighting). This is illustrated in FIG. 3, where $\omega_{new}=\beta \omega_{old}+(1-\beta)$ $\alpha$=new, or updated weighted average acceleration. Other information can be integrated into the calculations above to reach a more accurate pattern.

A computer-implemented algorithm is utilized to determine if spiking is occurring by graphing the acceleration and velocity, as calculated above, for a single parameter. The velocity just prior to an increase in acceleration is measured; this velocity is defined as the base velocity. The rate at which users are issuing queries for a particular parameter (defined as the peak acceleration) is measured every instant in which an acceleration is occurring, if the ratio of the acceleration to the velocity is greater than some predefined value, such as 1.5. A query is spiking if the weighted average acceleration is not less than a percentage of its peak value and if the weighted average velocity is greater than a percentage of its base value. Stated another way, a spiking occurs when the weighted average velocity is greater than its base velocity just prior to an acceleration occurrence, and the weighted average acceleration is equal to or greater than a percentage of a peak acceleration value at every instant in which acceleration is occurring. If the acceleration is negative for a particular query, then the query is losing importance. The above-described computer-implemented algorithm is processed using a computing system, such as that described with reference to FIG. 1.

The weight given to either the velocity or the acceleration can be varied. As more weight is given to one factor, the other factor is sacrificed to some degree. As an example, a first contribution by the previous, or old weighted average velocity can be varied with a second contribution by the instantaneous velocity. Together, the previous, or old weighted average velocity and the instantaneous velocity identify false spiking by averaging out instantaneous spikes. As another example, the speed for obtaining query results can be weighted more than the accuracy of the query results, or likewise, the accuracy can be weighted more than obtaining faster results.

Legitimate queries that are increasing in popularity can be identified by determining a weighted average query velocity from a weighted existing query velocity and a weighted instantaneous query velocity. The weighted average query velocity and the weighted existing query velocity can be modified according to a desired number of past sample points. A malicious attack is usually characterized by a fast uframping in acceleration, whereas legitimate traffic tends to have a slower uframped acceleration. In addition, malicious attacks tend to originate from a single IP address or user, while legitimate traffic tends to express queries in multiple words or phrases.

Figure 4:
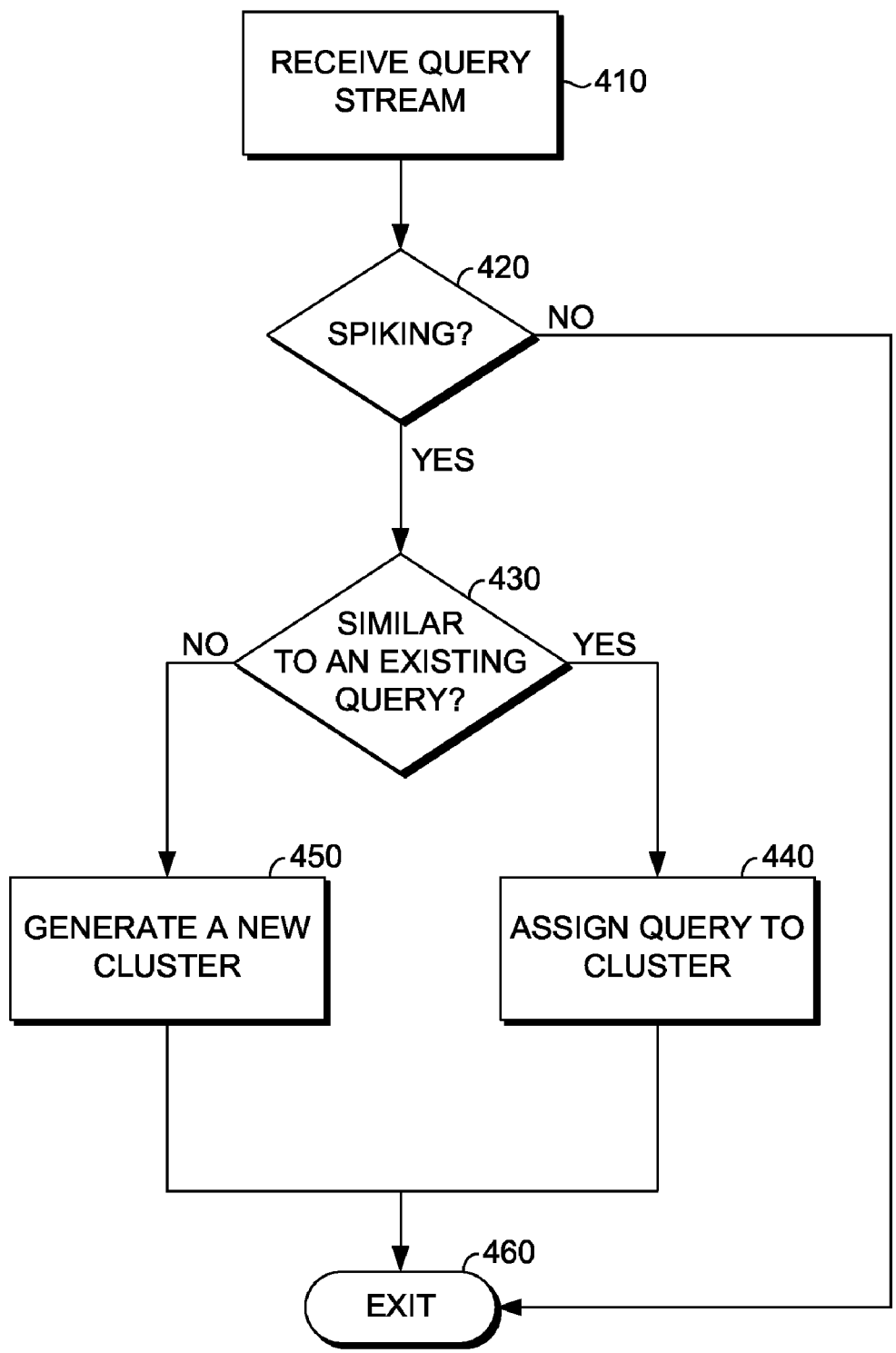
FIG. 4 is a flow diagram illustrating an exemplary method for detecting spiking and seasonal queries used in accordance with embodiments of the invention.

FIG. 4 is a flow diagram illustrating a method for detecting spiking and seasonal queries. A query stream is received at step 410. A determination is then made as to whether the query stream for a particular parameter is spiking at step 420, using the methods, calculations, and algorithms described above. If it is determined that spiking is occurring, then a search is conducted to determine whether a cluster already exists for that particular topic at step 430. Different indices are searched such as an historical index and a fresh document index. Variables are selected to assign a particular weight to one or more indices. For example, a new product on the market will have little historical information. Therefore, less weight would be assigned to the historical index and more weight would be assigned to the fresh document index. When a spike is detected, the fresh index will be refreshed more frequently than when no spiking is occurring. Similarly, current content sources are recrawled more frequently during a spike, than when no spiking occurs by means of a web crawler, which gathers and categorizes information from the Internet. The recrawl rate, which is the rate at which the web crawler updates its existing information, is automatically adjusted to a higher rate when a spike is detected. If an existing cluster is found to match the query, then the query is assigned to that cluster at step 440. If an appropriate existing cluster is not found after searching the indices, then a new cluster is generated at step 450. After the new cluster is generated, the process ends at step 460. If no spiking was determined at step 420, then the process also ends at that point at step 460.

Figure 5:
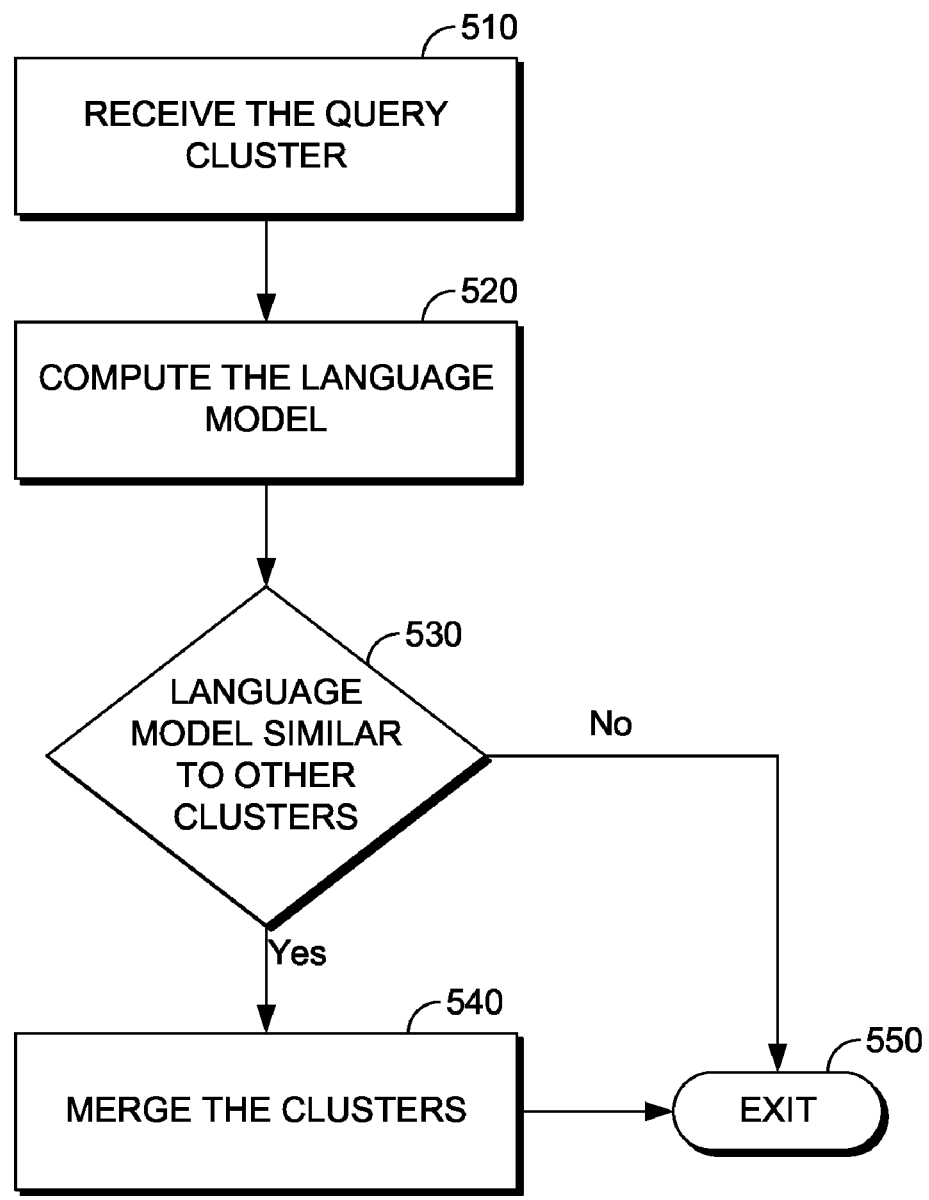
FIG. 5 is a flow diagram illustrating an exemplary method of receiving and merging clusters used in accordance with embodiments of the invention.

FIG. 5 is a flow diagram for illustrating a method of receiving and possibly merging clusters, which could be treated as an extension of FIG. 4 when queries are assigned to new or existing clusters. A query cluster is received at step 510. The language model is computed at step 520, wherein clusters with several similar timelines would use a temporal-based language model based upon a temporal distribution, and clusters with several common terms would use a textual-based language model. If the language model is similar to other clusters at step 530, then that cluster is merged with the similar existing clusters at step 540. After merging the clusters at step 540, or if there are no similar clusters to merge with the received cluster at step 530, then the process ends at step 550.

Figure 6:
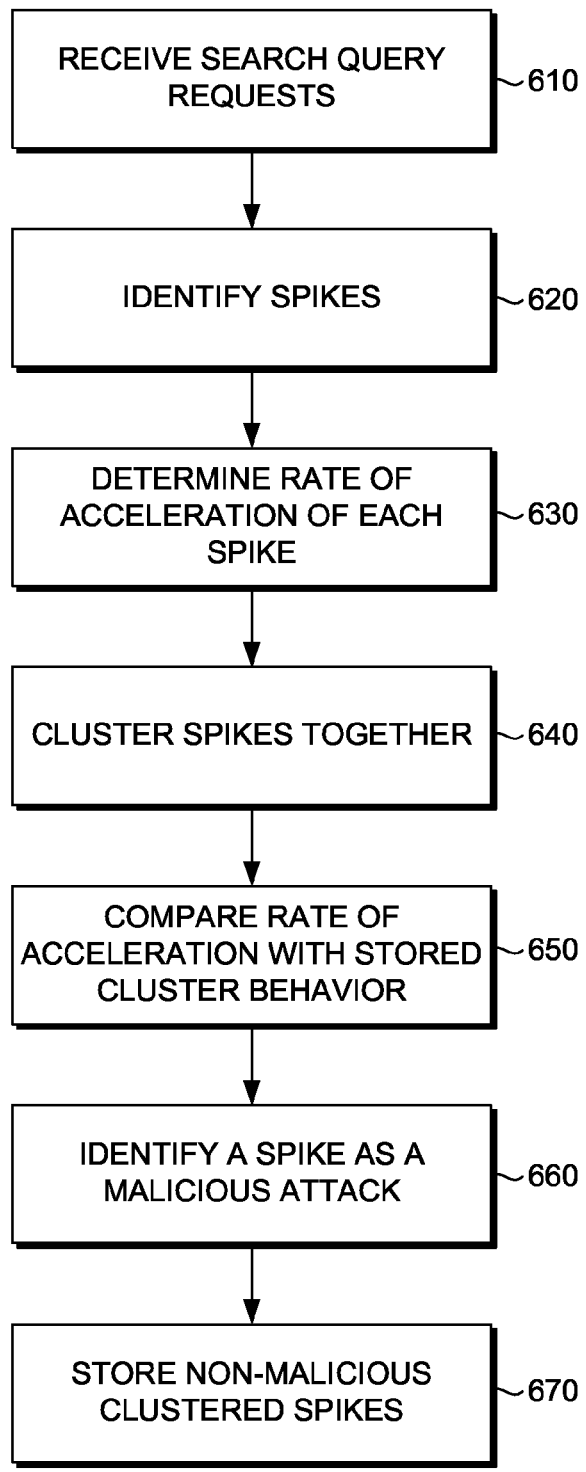
FIG. 6 is a flow diagram illustrating an exemplary method of identifying a legitimate search query spike used in accordance with embodiments of the invention.

FIG. 6 is a flow diagram illustrating a computer-implemented method of identifying a legitimate search query spike. A plurality of search query requests is received from one or more user input devices at step 610. One or more spikes that may be present in the received search query requests are identified at step 620. A rate of acceleration for each received spike is determined at step 630 by utilizing the methods described above with reference to FIG. 3, as an example. The identified spikes are then clustered together according to a temporal or textual correlation at step 640. The identified spikes can also be clustered together with a plurality of similar stored search query results. The determined rate of acceleration for the clustered identified spikes is compared with a similar temporal behavior of stored clusters at step 650. An identified spike can be considered to be malicious when the determined rate of acceleration exceeds a first threshold level and a comparison to temporal behavior is lower than a second threshold level at step 660. For example, a malicious attack will usually have a sharp increase in acceleration, since the malicious queries usually originate from a single IP address or user. Legitimate queries have a more gradual acceleration nature. In addition, a malicious attack will usually have no prior history, and therefore, no associated temporal behavior with stored clusters. The non-malicious clustered spikes of received search query requests and results are then stored as one or more groups of content at step 670. These stored one or more groups of content can be used for comparison and as query suggestions to future related search query requests.

The one or more groups of content prepare for future clustering by generating a calendar for future galleries, which contain clustered results with similar timelines for a particular period in time. Therefore, as described above, a query for pumpkins will be clustered with previously stored seasonal galleries for October and Halloween. Seasonal results are given if the query input is similar to the stored seasonal clusters, and the time of year for the query input matches the temporal behavior of the stored clusters. Query suggestions can also be generated from the stored content groups, such as stored seasonal galleries. In addition, seasonal spikes are used for responding to other queries; information from the spikes is separated and extracted or mined. Clustering identified spikes together reduces a number of false spikes, improves classification accuracy for detecting popular queries, and detects seasonal queries by comparing clustering across a number of time periods.

Figure 7:
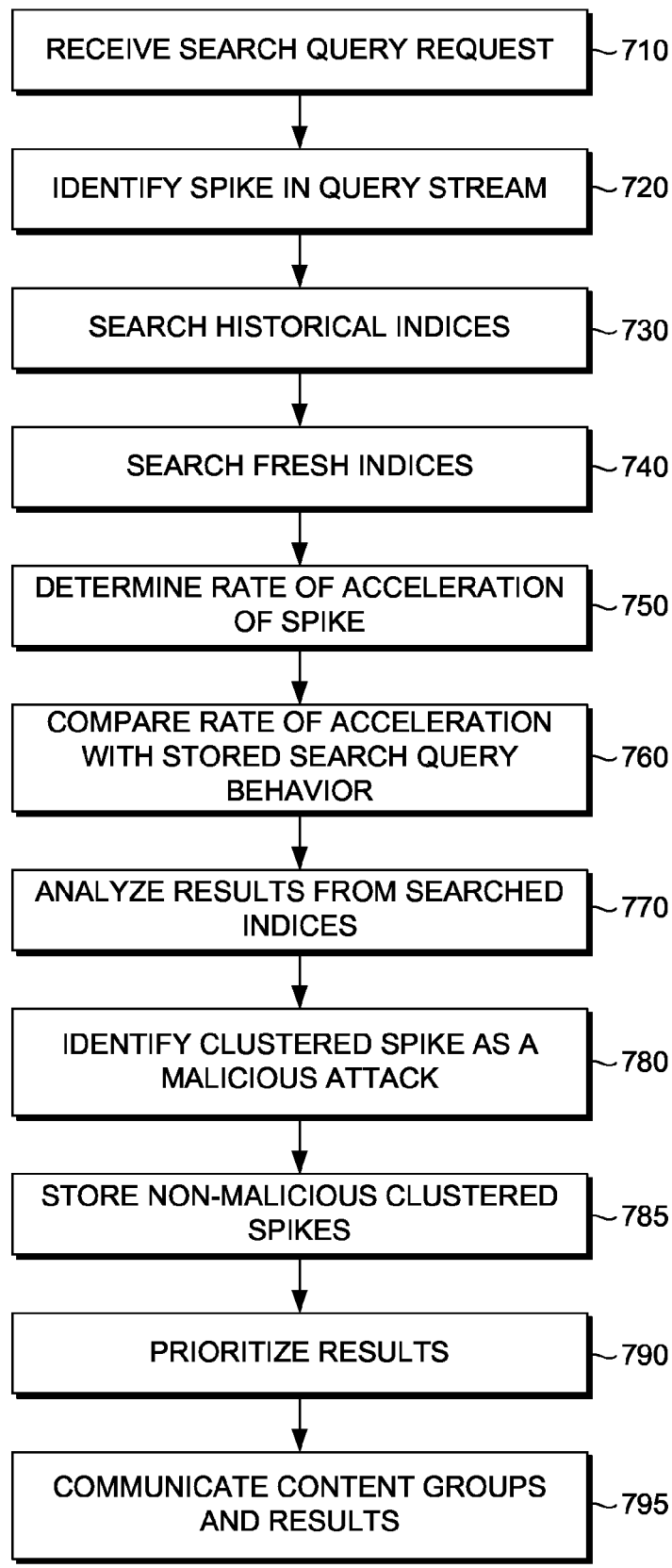
FIG. 7 is a flow diagram illustrating an exemplary method of producing popular search query results used in accordance with embodiments of the invention.

FIG. 7 is a flow diagram illustrating a computer-implemented method of producing popular search query results. A search query request is received from a user input device at step 710. A spike in a query stream, which comprises the received search query request and other incoming search query requests is identified at step 720. A plurality of historical indices, which contain information and results that are temporally correlated to the spike in the query stream are searched at step 730. A plurality of fresh indices, which contain information and results from recently crawled content sources that are correlated to the spike in the query stream are also searched at step 740. The fresh indices are refreshed more frequently and the content sources are crawled more frequently when a spike is detected. A rate of acceleration in which the spike in the query stream is received is determined at step 750. The determined rate of acceleration is compared with a temporal behavior of similar stored search queries at step 760. Results from searching the historical and fresh indices are analyzed to determine if the search query request should be clustered with an existing group of search query results, via a grouped content algorithm at step 770. A particular clustered spike in the query stream can be identified as a malicious attack when a rate of acceleration exceeds a first threshold level and a comparison to temporal behavior is lower than a second threshold level at step 780. An acceleration rate of non-malicious clustered spikes can be determined when the clustered spikes are below a peak acceleration rate and when the average velocity is a certain percentage over the base velocity. The non-malicious clustered spikes of the query stream are stored as one or more groups of content at step 785. The results of the search query request are prioritized according to an age and size of identified clustered results at step 790. The one or more groups of content and prioritized results of the search query request are communicated to a user output device at step 795. The seasonal gallery groups of content contain a calendar of clustered seasonal results, where the clustered seasonal results have a common timeline over a particular calendar period of time. The calendar is retrieved from the data storage subsystem. An example of a calendar of a clustered seasonal result is a calendar for the month of October, in which multiple queries for "pumpkin" and "Halloween" are clustered at the end of the month. These stored seasonal galleries are combined with similar query stream requests to provide query suggestions.

Figure 8:
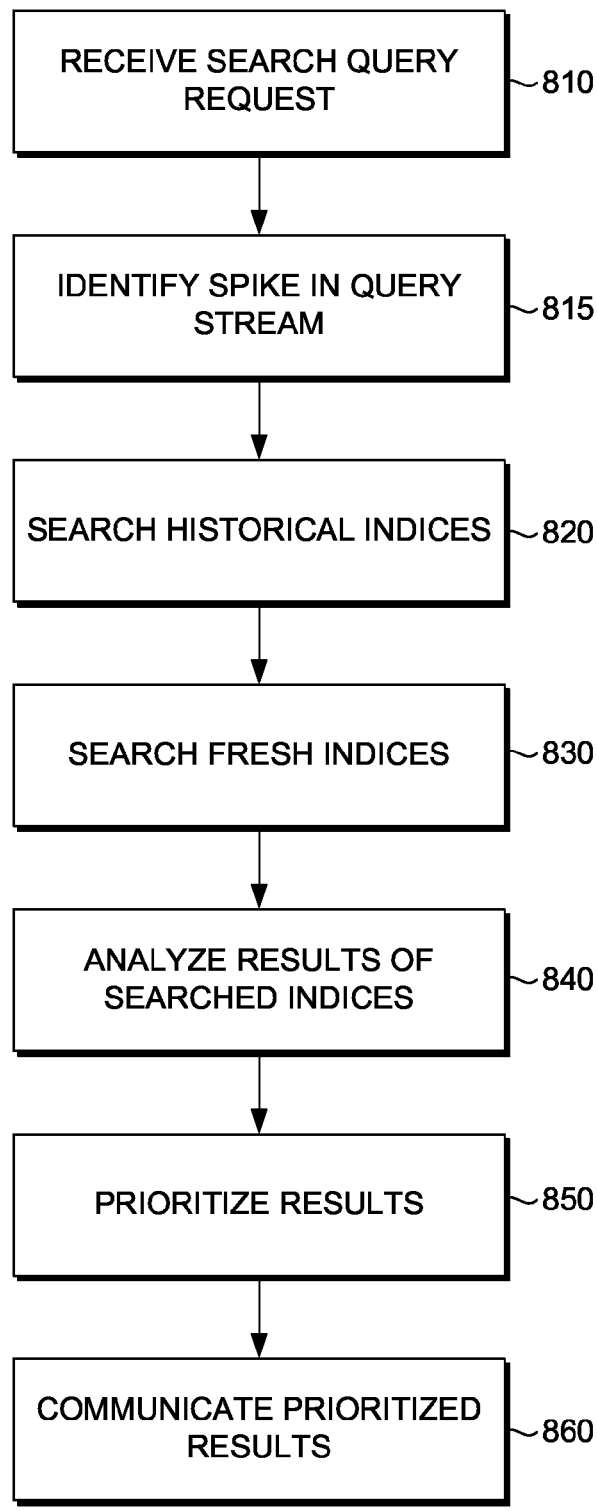
FIG. 8 is a flow diagram illustrating an exemplary method of identifying and clustering queries used in accordance with embodiments of the invention.

FIG. 8 is a flow diagram illustrating a computer-implemented method of identifying and clustering queries that are increasing in popularity. A search query request is received from a user input device at step 810. A spike in a query stream activity, which comprises the search query request, is identified at step 815. A plurality of historical indices, which contain information and results that are temporally correlated to the spike in the query stream activity are searched at step 820. This searching of historical indices comprises extracting information from previously stored clustered groups of content with similar characteristics to the search query request. A plurality of fresh indices, which contain information and results from recently crawled content sources are searched at step 830. The recently crawled content sources contain results of one or more identified spikes in previous query stream activity. The fresh indices are continually updated with information from relevant classified queries in reaction to a popularity of a query. The one or more identified spikes contain temporal or textual correlations to the search query request. Results from searching the historical and fresh indices are analyzed to determine if the search query request should be clustered with an existing group of search query results at step 840. Results of the search query request are prioritized according to an age and size of identified clustered results at step 850. The prioritized results and any query suggestions are communicated to a user output device at step 860. Temporally relevant, or similar timeline online advertisements can also be suggested with the communicated results, such as advertisements for Halloween costumes during the month of October.

Many different arrangements of the various components depicted, as well as embodiments not shown, are possible without departing from the spirit and scope of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of identifying a legitimate search query spike using a computing system having memory, processor, and data storage subsystems, the computer-implemented method comprising:
   receiving a plurality of search query requests from one or more user input devices;
   identifying one or more spikes in the received search query requests;
   clustering the identified spikes together according to a temporal or textual correlation;
   determining a rate of acceleration in which each spike in the search query requests is received via the processor of the computing system;
   comparing the determined rate of acceleration for the clustered identified spikes with a similar temporal behavior of stored clusters;
   identifying a particular clustered spike of received search query requests as a malicious attack when the determined rate of acceleration exceeds a first threshold level and a comparison to temporal behavior is lower than a second threshold level; and
   storing non-malicious clustered spikes of received search query requests and results as one or more content groups in the data storage subsystem of the computing system for comparison and query suggestions to future related search query requests.

2. The computer-implemented method of claim 1, wherein the identifying one or more spikes comprises:
   determining an instantaneous velocity of each query request from the query stream for a particular parameter, calculated as an inverse of a difference in time between an instant query request and a most recent query request for the particular parameter;
   calculating an updated weighted average velocity from a combination of a previous weighted average velocity and a weighted instantaneous velocity for the particular parameter;
   calculating an instantaneous acceleration of each query request for the particular parameter as a difference between the updated weighted average velocity and the previous weighted average velocity, per the difference in time between an instant query request and a most recent query request; and
   determining an updated weighted average acceleration from a combination of a previous weighted average acceleration and a weighted instantaneous acceleration for the particular parameter.

3. The computer-implemented method of claim 2, wherein a spiking occurs when the weighted average velocity is greater than a base velocity just prior to an acceleration occurrence and the weighted average acceleration is equal to or greater than a percentage of a peak acceleration value at every instant in which acceleration is occurring.

4. The computer-implemented method of claim 2, wherein a first contribution by the previous weighted average velocity can be varied with a second contribution by the instantaneous velocity.

5. The computer-implemented method of claim 2, wherein the previous weighted average velocity and the instantaneous velocity identify false spiking by averaging out instantaneous spikes.

6. The computer-implemented method of claim 1, wherein the clustering further comprises clustering the identified spikes together with a plurality of similar stored search query results.

7. The computer-implemented method of claim 1, wherein the clustering produces a reduced number of false spikes, improves classification accuracy for detecting popular queries, and detects seasonal queries by comparing clustering across a number of time periods.

8. A computer-implemented method of producing popular search query results using a computing system having memory, processor, and data storage subsystems, the computer-implemented method comprising:
receiving a search query request from a user input device;
identifying a spike in a query stream comprising the received search query request and other incoming search query requests;
temporally correlating the spike in the query stream with relevant content from a plurality of historical indices as a result of searching said historical indices;
correlating the spike in the query stream with relevant content from a plurality of fresh indices as a result of searching said fresh indices, wherein the fresh indices contain information and results from recently crawled content sources;
determining a rate of acceleration in which the spike in the query stream is received via the processor of the computing system;
comparing the determined rate of acceleration with a temporal behavior of similar stored search queries;
analyzing results from searching the historical indices and the fresh indices to determine if the search query request should be clustered with an existing group of search query results via a grouped content algorithm;
identifying a particular clustered spike in the query stream as a malicious attack when a rate of acceleration exceeds a first threshold level and a comparison to temporal behavior is lower than a second threshold level;
storing non-malicious clustered spikes of the query stream as one or more seasonal galleries in the data storage subsystem of the computing system;
prioritizing results of the search query request according to an age and size of identified clustered results; and
communicating the one or more seasonal galleries and the prioritized results of the search query request to a user output device.

9. The computer-implemented method of claim 8, wherein the non-malicious clustered spikes comprise an acceleration rate which is below a peak acceleration rate and an average velocity which has increased a certain percentage over the base velocity.

10. The computer-implemented method of claim 8, wherein the fresh indices are refreshed more frequently and the content sources are crawled more frequently when a spike is detected.

11. The computer-implemented method of claim 8, wherein the one or more seasonal galleries comprise a calendar of clustered seasonal results retrieved from the data storage subsystem.

12. The computer-implemented method of claim 11, wherein one or more of the stored seasonal galleries are combined with one or more similar query stream requests to provide query suggestions to the user input device.

13. A computer-implemented method of identifying and clustering queries that are increasing in popularity using a computing system having memory, processor, and data storage subsystems, the computer-implemented method comprising:
receiving a search query request from a user input device;
identifying a spike in incoming query stream activity comprising the search query request;
temporally correlating the spike in the incoming query stream activity with relevant content from a plurality of historical indices as a result of searching said historical indices;
correlating the spike in the incoming query stream activity with relevant content from a plurality of fresh indices as a result of searching said fresh indices, wherein the fresh indices contain information and results from recently crawled content sources;
analyzing results from searching the historical indices and the fresh indices to determine if the search query request should be clustered with an existing group of search query results;
prioritizing results of the search query request according to an age and size of identified cyclic clustered results; and
communicating the prioritized results of the search query request to a user output device.

14. The computer-implemented method of claim 13, wherein the searching a plurality of historical indices comprises extracting information from previously stored cyclic clustered results with similar characteristics to the search query request.

15. The computer-implemented method of claim 13, further comprising communicating query suggestions from said analyzing.

16. The computer-implemented method of claim 13, further comprising suggesting temporally relevant online advertisements to the user device.

17. The computer-implemented method of claim 13, wherein the fresh indices are continually updated with information from relevant classified queries in reaction to a popularity of a query.

18. The computer-implemented method of claim 13, further comprising:
identifying a particular clustered spike of received search query requests as a malicious attack when a determined rate of acceleration exceeds a first threshold level and a comparison to temporal behavior is lower than a second threshold level.

19. The computer-implemented method of claim 13, further comprising:
identifying legitimate queries that are increasing in popularity by determining a weighted average query velocity from a weighted existing query velocity and a new instantaneous query velocity.

20. The computer-implemented method of claim 19, wherein one or more of the weighted average query velocity and the weighted existing query velocity are modified according to a desired number of past sample points.

* * * * *